United States Patent
Kim et al.

(10) Patent No.: US 8,596,680 B2
(45) Date of Patent: Dec. 3, 2013

(54) AIRBAG FOR VEHICLE

(71) Applicant: Autoliv Development AB, Vargarda (SE)

(72) Inventors: Tae-Hoon Kim, Wonju-si (KR); Se-Hwa Jeong, Wonju-si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/657,939

(22) Filed: Oct. 23, 2012

(65) Prior Publication Data

US 2013/0099466 A1    Apr. 25, 2013

(30) Foreign Application Priority Data

Oct. 25, 2011    (KR) .......................... 10-2011-0109504

(51) Int. Cl.
*B60R 21/2338*    (2011.01)

(52) U.S. Cl.
USPC .................................... 280/743.2; 280/728.2

(58) Field of Classification Search
USPC ........................................... 280/743.2, 728.2
See application file for complete search history.

(56) References Cited

U.S. PATENT DOCUMENTS

| | | | |
|---|---|---|---|
| 5,609,363 A * | 3/1997 | Finelli ........................ | 280/743.2 |
| 7,040,650 B2 | 5/2006 | Neupert et al. | |
| 7,152,879 B2 | 12/2006 | Kai | |
| 7,931,299 B2 | 4/2011 | McFadden et al. | |
| 2011/0079850 A1 | 4/2011 | Koo et al. | |

* cited by examiner

*Primary Examiner* — Drew Brown
(74) *Attorney, Agent, or Firm* — Harness, Dickey & Pierce, P.L.C.

(57) ABSTRACT

Disclosed is a vehicle airbag. The vehicle airbag includes a deployment restricting member linked with an upper portion of a rear surface part of an outer portion of the vehicle airbag, prepared in a strip shape, and having one end statically fixed with a collar of the vehicle airbag in adjacent to the collar of the vehicle airbag and an opposite end coupled with the upper portion of the rear surface part of the outer portion of the vehicle airbag, thereby delaying the rear surface part of the vehicle airbag. A tear part is provided at the central portion of the deployment restricting member so that the tear part is torn under a predetermined pressure. In initial deployment of the vehicle airbag, the upper portion of the rear surface part of the airbag is confined in a folded state, so that the lower portion of the airbag is first inflated. The airbag is prevented from being suddenly inflated, thereby preventing the chest, the neck, or the head of the occupant from being injured.

16 Claims, 5 Drawing Sheets

AIRBAG FOR VEHICLE

CROSS-REFERENCE TO RELATED APPLICATIONS

This application claims the benefit and priority of Korean Patent Application No. 10-2011-0106504 filed 25 Oct. 2011. The entire disclosure of the above application is incorporated herein by reference.

FIELD

Field of the Invention

The present invention relates to a vehicle safety device. In more particular, the present invention relates to an inflatable airbag for a vehicle, capable of protecting an occupant from vehicle collision.

BACKGROUND

Description of the Related Art

This section provides background information related to the present disclosure which is not necessarily prior art.

In general, an inflatable airbag for a vehicle that is inflated upon vehicle collision to protect an occupant from the vehicle collision has been extensively known to those skilled in the art.

The vehicle airbag is installed in a folded state in a steering wheel at a driver seat or an instrument panel at a passenger seat together with an inflator.

Upon vehicle collision, the inflator operates to discharge inflation gas into the airbag, and the folded airbag is deployed between an occupant and the steering wheel at the driver seat, or between an occupant and the instrument panel at the passenger seat, thereby protecting the chest, the head, and the neck of the occupant.

The above vehicle airbag is suddenly inflated toward the occupant in initial deployment to strike the chest, the head, and the neck of the occupant, so that the occupant has been injured by the airbag.

SUMMARY

This section provides a general summary of the disclosure, and is not a comprehensive disclosure of its full scope or all of its features.

Accordingly, the present invention has been made keeping in mind the above problems occurring in the prior art, and an object of the present invention is to an airbag for a vehicle, capable of confining the upper portion of the rear surface part of the airbag in a folded state when initially deploying the airbag, thereby preventing an occupant from being injured as the airbag is suddenly inflated toward the chest, the neck, or the head of the occupant.

To accomplish these objects, according to one aspect of the present invention, there is provided a vehicle airbag including a deployment restricting member linked with an upper portion of a rear surface part of an outer portion of the vehicle airbag, prepared in a strip shape, and having one end coupled with a collar of the vehicle airbag in adjacent to the collar of the vehicle airbag and an opposite end coupled with the upper portion of the rear surface part of the outer portion of the vehicle airbag, thereby delaying deployment of the upper portion of the rear surface part of the vehicle airbag.

According to the present invention, the deployment restricting member is provided at a central portion thereof with a tear part which is torn under a predetermined pressure of the vehicle airbag, the tear part includes a tear line formed perpendicularly to a longitudinal axis of the deployment restricting member and having at least two cut parts and a gap between the two cut parts, and tear strength of the tear part is adjusted by adjusting a number and widths of the cut parts and the gap.

According to the present invention, the one end of the deployment restricting member is interposed between the collar of the vehicle airbag and a base plate so that the one end of the deployment restricting member is supported on a front surface of the base plate together with the collar of the vehicle airbag through a retainer. The one end of the deployment restricting member is provided therein with a coupling hole through which a coupling member passes, so that the one end of the deployment restricting member is fixed together with the collar of the vehicle airbag, the retainer, and the base plate through the coupling member. The coupling hole is provided in a shape of an elongate hole having a long side extending in a longitudinal direction of the deployment restricting member.

As described above, according to the airbag for the vehicle of the present invention, the upper portion of the rear surface part of the airbag is confined in a folded state when initially deploying the airbag by using a deployment restricting member, thereby delaying the inflation of the airbag, so that the lower portion of the airbag is first inflated. Therefore, the airbag is prevented from being suddenly inflated toward the occupant, thereby preventing the chest, the neck, or the head of the occupant from being injured.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The above and other objects, features and other advantages of the present invention will be more clearly understood from the following detailed description when taken in conjunction with the accompanying drawings, in which.

Corresponding reference numerals indicate corresponding parts throughout the several views of the drawings.

DETAILED DESCRIPTION

Example embodiments will now be described more fully with reference to the accompanying drawings.

Hereinafter, a direction toward an occupant O is defined as a front direction F, an opposition direction to the occupant O is defined as a rear direction R, a direction toward an upper portion of a central axis C of an airbag module 1 is defined as an upper direction U, and a direction toward a lower portion of the central axis C of the airbag module is defined as a lower direction L.

Figure 1:
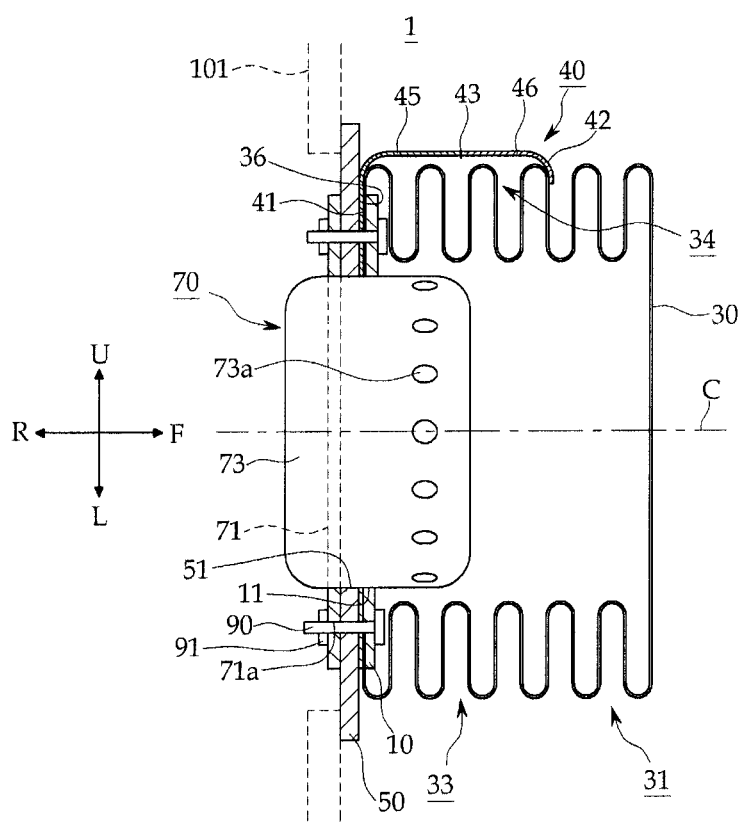
FIG. 1 is a sectional view showing an airbag module for a vehicle according to the present invention.

FIG. 1 is a sectional view showing the airbag module 1 for a vehicle according to the present invention.

Referring to FIG. 1, the airbag module 1 includes a retainer 10, an airbag 30, a deployment restricting member 40, a base plate 50, and an inflator 70.

The airbag 30 includes a front surface part 31 directed toward the occupant O and a rear surface part 33 allowing the inflator 70 to protrude into the airbag 30. The airbag 30 is placed on a front surface of the base plate 50, and includes a collar 36 defining an opening.

The deployment restricting member 40 includes a strip-shape member having one end 41 statically fixed between the collar 36 of the airbag 30 and the base plate 50 and, an opposite end 42 linked with an upper portion 34 of the rear surface part of the airbag 30.

The retainer 10 includes a central hole provided in the front surface of the collar 36 of the airbag 30 and allowing a sidewall 73 of the inflator 70 to passes therethrough.

The base plate 50 is provided therein with an inflator receiving hole 51 to receive the sidewall 73 of the inflator 70.

The inflator 70 includes a plurality of inflator holes 73a formed in the sidewall 73 of the inflator 70 while being spaced apart from each other by a predetermined distance, and a flange 71 protruding radially outwardly from the sidewall 73 to make contact with a bottom surface of the base plate 50.

The retainer 10, the collar 36 of the airbag 30, the base plate 50, and the flange 71 of the inflator 70 are fixed together through a coupling bolt 90 and a coupling nut 91.

For example, the airbag module 1 for the vehicle is coupled with a specific support member 101 provided inside a steering wheel of a driver seat and an instrument panel of a passenger seat, so that the airbag module 1 is placed inside the steering wheel of the driver seat and the instrument panel of the passenger seat.

Figure 2:
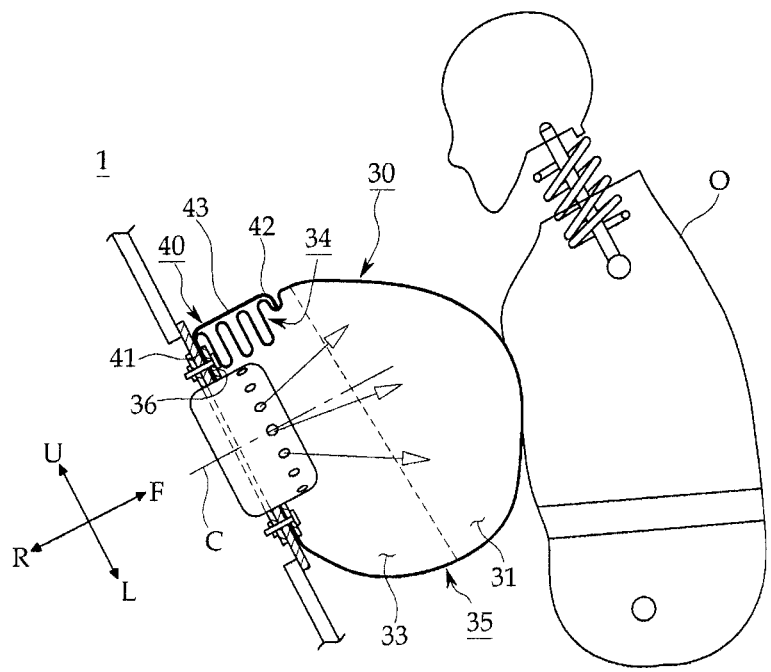
FIG. 2 is a sectional view showing an initial deployment state of an airbag of FIG. 1.
Figure 3:
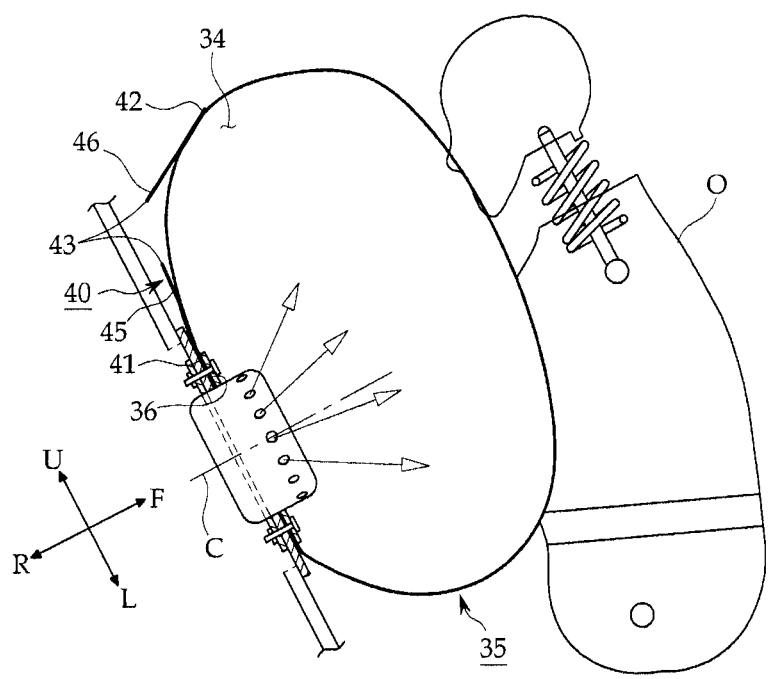
FIG. 3 is a sectional view showing a full deployment state of the airbag of FIG. 2.

FIG. 2 is a sectional view showing an initial deployment state of the airbag 30 of FIG. 1, and FIG. 3 is a sectional view showing a full deployment state of the airbag 30 of FIG. 2.

Referring to FIGS. 2 and 3, the deployment restricting member 40 confines the upper portion 34 of the rear surface part 33 of the airbag 30 in a folded state until the inflation pressure of the airbag 30 approximates a predetermined value when the airbag 30 is initially deployed.

The deployment restricting member 40 includes a tear part 43 which is provided at a central portion thereof and torn under a predetermined inflation pressure to divide the deployment restricting member 40 into two parts 45 and 46.

The deployment restricting member 40 confines the upper portion 34 of the rear surface part 33 of the airbag 30 in a folded state to first inflate the lower portion of the airbag 30 when the airbag 30 is initially deployed. Accordingly, the deployment restricting member 40 prevents the front surface of the airbag 30 from being suddenly inflated in the front direction F toward the chest, the head, and the neck of the occupant O, so that the occupant O is prevented from being injured by the airbag 30.

Thereafter, if the internal pressure of the airbag 30 approximates a predetermined pressure, the tear part 43 of the deployment restricting member 40 is torn to divide the deployment restricting member 40 into the two parts 45 and 45. As a result, the upper portion 34 of the rear surface part 33 of the airbag 30 in the folded state is normally inflated to protect the chest, the head, and the neck of the occupant O.

Figure 4:
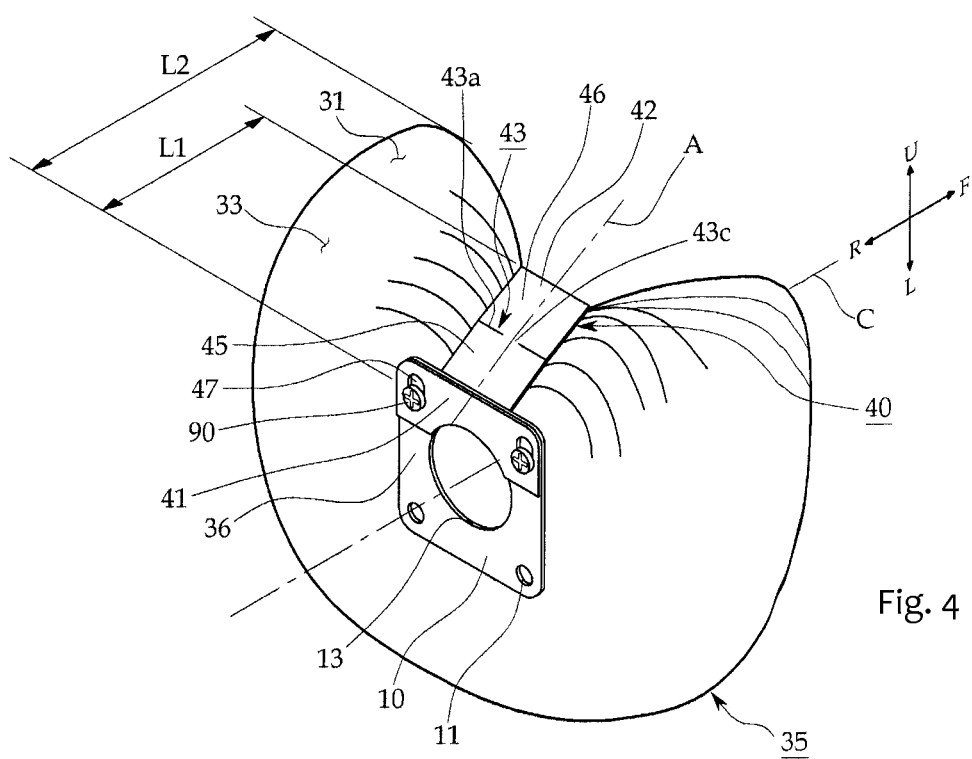
FIG. 4 is a perspective view showing the initial deployment state of the airbag of FIG. 1.
Figure 5:
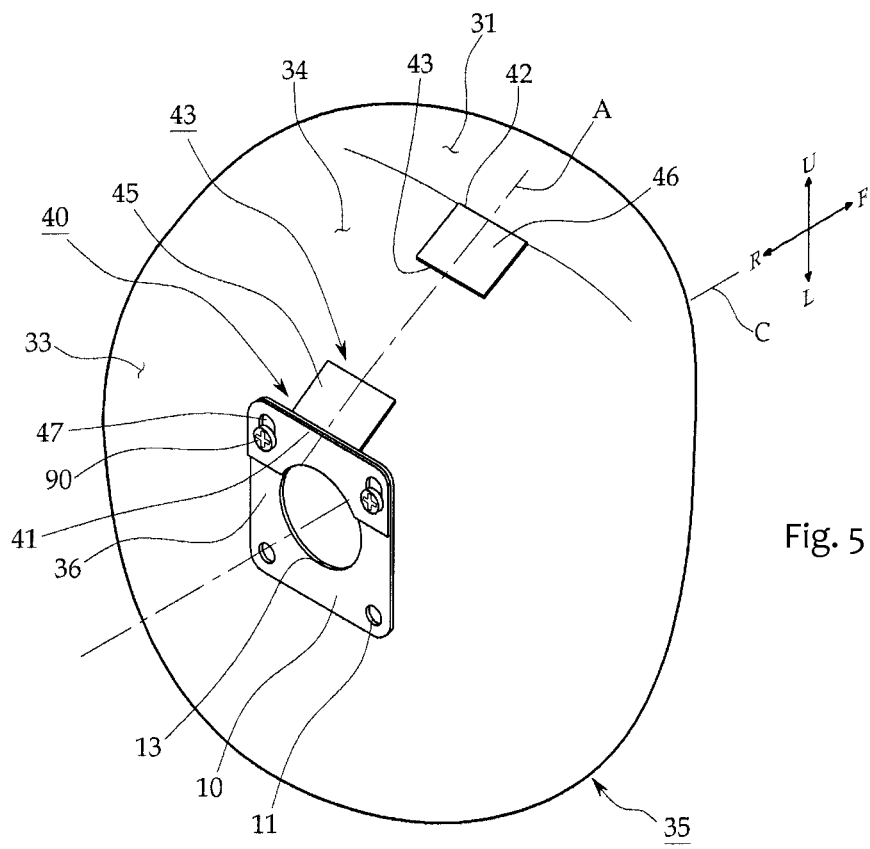
FIG. 5 is a perspective view showing the full deployment state of the airbag of FIG. 2.

FIG. 4 is a perspective view showing the initial deployment state of the airbag 30 of FIG. 1, and FIG. 5 is a perspective view showing a full deployment state of the airbag 30 of FIG. 1.

Referring to FIGS. 4 and 5, the end 41 of the deployment restricting member 40 is placed on the collar 36 of the airbag 30, having a shape substantially corresponding to that of an upper portion of the retainer 10 and formed with a coupling hole 47 allowing the coupling member 90 to pass therethrough. The coupling hole 47 is placed corresponding to that of a coupling hole 11 of the retainer 10.

The coupling member 90 simultaneously fixes the retainer 10, the collar 36 of the airbag 30, the base plate 50, and the flange 71 of the inflator 70. The end 41 of the deployment restricting member 40 is supported together with the airbag 36 onto the base plate 50 through the retainer 10 by using the coupling member 90.

The coupling hole 47 is prepared as an elongate hole with a long side extending along the longitudinal axis C of the deployment restricting member 40.

The end 41 of the deployment restricting member 40 is not limited to that the end 41 of the deployment restricting member 40 is fixed to the collar 36 of the airbag 30 through the retainer 10 in adjacent to the collar 36 of the airbag 30. In other words, the ends 41 of the deployment restricting member 40 may be fixed to all surfaces allowing the static fixture without the influence by the deployment behavior of the airbag 30.

The opposite end 42 of the deployment restricting member 40 may be coupled with the upper portion 34 of the rear surface part 33 of an outer portion of the airbag 30 through a sewing line.

The deployment restricting member 40 is provided at the substantially central portion of the upper portion 34 of the rear surface part 33 of the airbag 30, so that both sides of the airbag 30 are deployed in substantially symmetrical to each other about the central portion of the deployment restricting member 40 when the airbag 30 is deployed.

The deployment restricting member 40 is provided at the central portion thereof with the tear part 43 which is substantially perpendicular to the longitudinal axis C of the deployment restricting member 40, prepared in the shape of a tear line, and including at least two cut parts 43a and a gap 43c.

The tear strength of the tear part 43 may be adjusted by adjusting the number and the width of the cut parts 43a and the gaps 43c.

The shape of the tear part 43 prepared in the form of the tear line may vary. For instance, the tear part 43 may be prepared as two parts 45 and 46 connected to each other through sewing lines. In this case, the tear strength of the tear part 43 may be adjusted by adjusting the width and the like of the sewing lines.

A length L1 extending along the longitudinal axis A of the deployment restricting member 40 is shorter than a length L2 of an upper portion of the airbag 30 in the state that the airbag 30 is fully inflated.

Figure 6A:
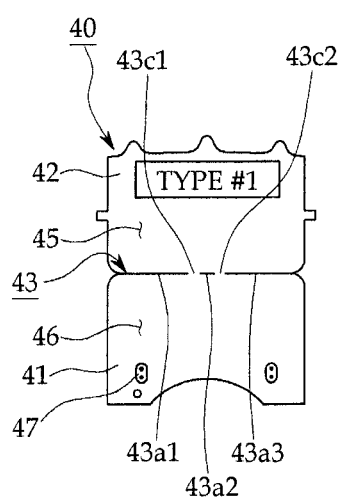
FIGS. 6A to 6C are top views showing a tear part of a deployment restricting member according to the present invention.
Figure 6B:
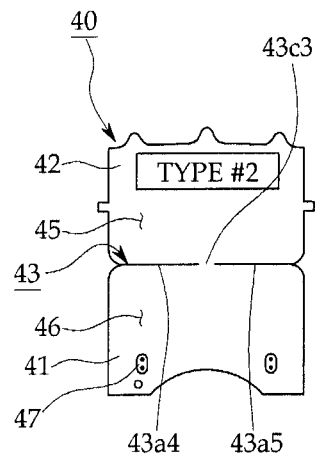
Figure 6C:
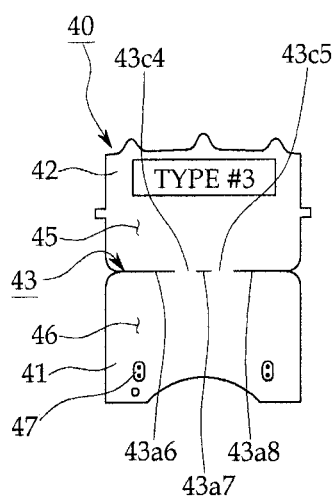

FIGS. 6A to 6C are top views showing the tear part 43 of the deployment restricting member 40 according to the present invention.

Referring to FIG. 6A, the deployment restricting member 40 has a width of about 100 mm, and includes the tear part 43 having three cut parts 43a1, 43a2, and 43a3, and two gaps 43c1 and 43c2.

The central cut part 43a2 may have a width of about 5 mm, and the two gaps 43c1 and 43c2 may have a width of about 5 mm.

Referring to FIG. 6B, the tear part 43 has two cut parts 43a4 and 43a5 and one gap 43c3. The gap 43c3 may have a width of about 7 mm.

Referring to FIG. 6C, the tear part 43 has three cut parts 43a6, 43a7, and 43a8, and two gaps 43c4 and 43c5. The two gaps 43c4 and 43c5 have a width of about 6 mm, and the central cut part 43a7 has a width of about 8 mm.

As described above, the tear strength of the tear part 43 can be adjusted by variously adjusting the number and the width of cut parts 43a and gaps 43c of the tear part 43. The strength to confine the upper portion 34 of the rear surface part 33 of the airbag 30 in the folded state can be adjusted according to the tear length.

If the tear strength is excessively strong, the lower portion 35 of the airbag 30 may be lifted in the upper direction U to strike the chest of the occupant O.

The tear strength of the tear part 43 must be properly adjusted by taking the above situation into consideration.

Referring to FIGS. 2 and 4, upon vehicle collision, inflation gas is generated from the inflator 70 and discharged into the airbag 30, so that the airbag 30 is deployed.

When the airbag 30 is initially deployed, in other words, until the internal pressure of the airbag approximates a predetermined value, the deployment restricting member 40 is maintained in a tension state, so that the upper portion 34 of the rear surface part 33 of the airbag 30 can be maintained in the folded state.

As a result, the lower portion 35 of the airbag 30 is more inflated toward the occupant O because the lower portion 35 of the airbag 30 is inflated first. Therefore, the airbag 30 can be prevented from being suddenly deployed substantially along the axis C by the inflation gas radially discharged from the inflator 70. Accordingly, the striking to the chest, the head, and the neck of the occupant O is reduced, so that the occupant O can be prevented from being injured.

Referring to FIGS. 3 to 5, if the airbag 30 is continuously inflated so that the internal pressure of the airbag 30 approximates the predetermined value, the tear part 43 of the deployment restricting member 40 in the tension state is torn, so that the deployment restricting member 40 is divided into the two parts 45 and 46.

Thereafter, the upper portion 34 of the rear surface part 33 of the airbag 30 in the folded state is normally deployed, so that the airbag 30 is fully inflated to protect the chest, the head, and the neck of the occupant O.

Although a preferred embodiment of the present invention has been described for illustrative purposes, those skilled in the art will appreciate that various modifications, additions and substitutions are possible, without departing from the scope and spirit of the invention as disclosed in the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle airbag installed at a front of a vehicle and deployed toward a front surface of an occupant, the vehicle airbag comprising: a deployment restricting member linked with an upper portion of a rear surface part of an outer portion of the vehicle airbag, the deployment restricting member having one end coupled with a collar of the vehicle airbag and an opposite end coupled with the upper portion of the rear surface part of the outer portion of the vehicle airbag, the deployment restricting member operative to at least initially delay deployment of the upper portion of the rear surface part of the vehicle airbag;

wherein the deployment restricting member is provided at a central portion thereof with a tear part adapted to be torn under a predetermined pressure of the vehicle airbag.

2. The vehicle airbag of claim 1, wherein the tear part includes a tear line formed perpendicularly to a longitudinal axis of the deployment restricting member and having at least two cut parts and a gap between the two cut parts, and tear strength of the tear part is adjusted by adjusting a number and widths of the cut parts and the gap.

3. The vehicle airbag of claim 1, wherein the one end of the deployment restricting member is interposed between the collar of the vehicle airbag and a base plate so that the one end of the deployment restricting member is supported on a front surface of the base plate together with the collar of the vehicle airbag through a retainer; and wherein the one end of the deployment restricting member is provided therein with a coupling hole through which a coupling member passes, so that the one end of the deployment restricting member is fixed together with the collar of the vehicle airbag, the retainer, and the base plate through the coupling member.

4. The vehicle airbag of claim 3, wherein the coupling hole is provided in a shape of an elongate hole having a long side extending in a longitudinal direction of the deployment restricting member.

5. A vehicle airbag installed at a front of a vehicle and deployed toward a front surface of an occupant, the vehicle airbag comprising: a deployment restricting member linked with an upper portion of a rear surface part of an outer portion of the vehicle airbag, the deployment restricting member having one end coupled with a collar of the vehicle airbag and an opposite end coupled with the upper portion of the rear surface part of the outer portion of the vehicle airbag, the deployment restricting member operative to at least initially delay deployment of the upper portion of the rear surface part of the vehicle airbag;

wherein the one end of the deployment restricting member is interposed between the collar of the vehicle airbag and a base plate so that the one end of the deployment restricting member is supported on a front surface of the base plate together with the collar of the vehicle airbag through a retainer; and wherein the one end of the deployment restricting member is provided therein with a coupling hole through which a coupling member passes, so that the one end of the deployment restricting member is fixed together with the collar of the vehicle airbag, the retainer, and the base plate through the coupling member.

6. The vehicle airbag of claim 5, wherein the coupling hole is provided in a shape of an elongate hole having a long side extending in a longitudinal direction of the deployment restricting member.

7. A vehicle airbag arrangement comprising:

a base;

an inflatable airbag secured to the base and deployable in a direction toward a vehicle occupant; and a deployment restricting member having a first end secured to the base and a second end secured to an upper portion of the inflatable airbag, the deployment restricting member operative to initially delay full deployment of the upper portion of the inflatable airbag and further operative to tear under a predetermined pressure of the inflatable airbag to permit full deployment of the upper portion of the inflatable airbag.

8. The vehicle airbag of claim 7, wherein the deployment restricting member functions to initially allow full deployment of a lower portion of the inflatable airbag and subsequent full deployment of the upper portion.

9. The vehicle airbag of claim 7, wherein the deployment restricting member extends over a top of the inflatable airbag.

10. The vehicle airbag of claim 7, wherein the deployment restricting member extends from the first end to the second end parallel to the direction of deployment of the inflatable airbag.

11. The vehicle airbag of claim 7, wherein the deployment restricting member includes a tear part adapted to be torn under the predetermined pressure.

12. The vehicle airbag of claim 11, wherein the tear part includes a tear line formed perpendicularly to a longitudinal axis of the deployment restricting member and having at least two cut parts and a gap between the two cut parts, and tear strength of the tear part is adjusted by adjusting a number and widths of the cut parts and the gap.

13. The vehicle airbag of claim 7, wherein the deployment restricting member is strip-shaped.

14. The vehicle airbag of claim 7, wherein the inflatable airbag is folded prior to deployment and the deployment restricting member retains folding of a portion of the upper portion of the inflatable airbag until the predetermined pressure is reached.

15. The vehicle airbag of claim 7, wherein the deployment restricting member prevents a front surface of the inflatable airbag from sudden inflation toward a chest, head and neck of a vehicle occupant.

16. The vehicle airbag of claim 7, wherein the first end of the deployment restricting member is coupled with a collar of the inflatable airbag.

* * * * *